US010725466B2

(12) United States Patent
Maidment et al.

(10) Patent No.: US 10,725,466 B2
(45) Date of Patent: Jul. 28, 2020

(54) CLOUD AND EDGE MANUFACTURING DATA PROCESSING SYSTEM

(71) Applicant: Oden Technologies Ltd., London (GB)

(72) Inventors: James Maidment, New York, NY (US); Deepak S. Turaga, New City, NY (US); John Turek, Nyack, NY (US)

(73) Assignee: Oden Technologies Ltd., London (GB)

( * ) Notice: Subject to any disclaimer, the term of this patent is extended or adjusted under 35 U.S.C. 154(b) by 0 days.

(21) Appl. No.: 16/192,511

(22) Filed: Nov. 15, 2018

(65) Prior Publication Data

US 2020/0159205 A1     May 21, 2020

(51) Int. Cl.
*G05B 23/02*     (2006.01)
*G05B 19/418*     (2006.01)
(Continued)

(52) U.S. Cl.
CPC ......... *G05B 23/0294* (2013.01); *G05B 15/02* (2013.01); *G05B 19/41855* (2013.01);
(Continued)

(58) Field of Classification Search
CPC ................ G05B 23/0294; G05B 15/02; G05B 19/41855; G05B 23/0283;
(Continued)

(56) References Cited

U.S. PATENT DOCUMENTS 10,037,025 B2    7/2018   Pallath et al.
10,057,173 B2    8/2018   Seed et al.
(Continued)

OTHER PUBLICATIONS

Operate more efficiently using IoT analytics and cognitive; retrived Feb. 3, 2020; 7 pages https://web.archive.org/web/20180719050102/https://www.ibm.com/internet-of-things/industries/iot-manufacturing.

(Continued)

*Primary Examiner* — Arvin Eskandarnia
(74) *Attorney, Agent, or Firm* — Lee & Hayes, P.C.

(57) ABSTRACT

Embodiments described herein relate to a system for processing manufacturing data, comprising: an edge device; a cloud platform; a sensing device configured to collect manufacturing data and to provide the collected data to the edge device; wherein the edge device and the cloud platform are each configured to carry out a plurality of data processing functions on the manufacturing data; the system further comprising a resource manager configured to communicate with the edge device and with the cloud platform, wherein the resource manager is further configured to: determine whether each of the plurality of data processing functions is to be carried out at the edge device or at the cloud platform; if it is determined that the plurality of data processing functions is to be carried out at the edge device, instruct the edge device to carry out the plurality of data processing functions; if it is determined that the plurality of data processing functions is to be carried out at the cloud platform, instruct the cloud platform to carry out the plurality of data processing functions; and if it is determined that at least one of the plurality of data processing functions is to be carried out at the edge device and at least one other data processing function is to be carried out at the cloud platform, instruct the edge device to carry out the at least one of the plurality of data processing functions and instruct the cloud platform to carry out the at least one other data processing function.

18 Claims, 6 Drawing Sheets

(51) Int. Cl.
*G05B 15/02* (2006.01)
*H04L 12/26* (2006.01)
*G06F 9/50* (2006.01)
*H04L 29/08* (2006.01)

(52) U.S. Cl.
CPC ......... *G05B 23/0283* (2013.01); *G06F 9/505* (2013.01); *G06F 9/5077* (2013.01); *H04L 43/04* (2013.01); *H04L 67/10* (2013.01); *H04L 67/125* (2013.01); *G05B 2219/31151* (2013.01); *G05B 2219/31264* (2013.01); *G06F 2209/506* (2013.01)

(58) Field of Classification Search
CPC ........... G05B 2219/31151; G05B 2219/31264; H04L 43/04; H04L 67/10; H04L 67/125; G06F 9/505; G06F 9/5077; G06F 2209/506
See application file for complete search history.

(56) References Cited

U.S. PATENT DOCUMENTS

| | | | |
|---|---|---|---|
| 2015/0281233 A1* | 10/2015 | Asenjo | G06F 21/44 726/7 |
| 2018/0167445 A1 | 6/2018 | Speight et al. | |
| 2018/0299873 A1 | 10/2018 | Chauvet et al. | |
| 2019/0064787 A1* | 2/2019 | Maturana | G05B 23/0283 |
| 2020/0068759 A1* | 2/2020 | Cvijetinovic | H05K 13/083 |

OTHER PUBLICATIONS

Temburini, Diego "Enabling Smart Manufacturing with Edge Computing" retrieved Feb. 3, 2020; 9 pages; https://weh.archive.org/web/20180619181052/https://azure.microsoft.com/en-us/blog/enabling-smart-manufacturing-with-edge-computing/.

Urgaonkar, et al.; "Dynamic service migration and workload scheduling in edge-clouds" Performance Evaluation (2015), 24 pages.

What is Edge Computing; retrieved Feb. 4, 2020; 5 pages; https://web.archive.org/web/20181004223354/https://www.ge.com/digital/blog/what-edge-computing.

PCT Notification of Transmittal of the International Search Report and the Written Opinion of the International Searching Authority for International Application No. PCT/EP2019/081540; dated Feb. 26, 2020, 17 pages.

* cited by examiner

CLOUD AND EDGE MANUFACTURING DATA PROCESSING SYSTEM

FIELD

Embodiments described herein relate to a system and method for processing manufacturing data.

BACKGROUND

'Smart manufacturing' involves the collection of data during the manufacturing process, with the aim of monitoring and optimising the manufacturing process. For example, data concerning the operation of machines on the factory floor, quality of the material and product, and environmental conditions is collected, processed, and analysed in order to determine whether the manufacturing process can be optimised in some way. As an example, following the analysis of data from a particular machine, it may become apparent that the machine should operate at a reduced speed in order to reduce the amount of down-time resulting from maintenance of the machine. As another example, the analysis of data collected from a particular machine may result in an indication that a change to the tooling of that machine would reduce variation in the physical dimensions of a part, thereby improving produce quality and reducing wastage.

Typically, data is collected by Internet of Things (IoT) devices. These devices include a sensor that collects data and a means of transferring the collected data (typically via a wireless communications link) to a computing system in which that data is processed.

In some existing smart manufacturing solutions, all data is analysed close to the point of collection (for example, on the factory floor). However, there are limitations on the amount of computing resources that can be deployed on the factory floor, and their ability to access any additional external data relevant to the process (e.g. offsite data stores, or data from other manufacturing facilities, or from the supply chain). The limitation on computing resources is further compounded by the environmental challenges that are particular to the factory floor (for example, a requirement for the computing resources to be sufficiently robust so as not to be damaged by dirt). These limitations on the amount of computing resources that can be deployed on the factory floor mean that the amount of data that is collected and analysed is limited. That is, only a relatively small window of data can be processed using computing resources deployed on the factory floor. Given the relatively small window of data, and its potential incompleteness, any temporal variations or noise in the manufacturing data can have a significant impact on the outcome of the data analysis.

In other existing solutions, data is collected and processed using cloud platforms (i.e. "in the cloud"), meaning that data is not processed on the factory floor. Analysing the data in the cloud allows an increased amount of data, and data from different locations and facilities, to be analysed (compared with data analysis on the factory floor). However, connectivity to the cloud is not guaranteed. For example, a natural disaster such as a large fire or earthquake may damage communications lines, disrupting the communications link between the factory and the cloud. This means that "mission critical" data processing (i.e. data that is required for the manufacturing process to run) may not be able to be processed, because of the disruption of the communications link. The consequence of the lack of processing of the mission critical data is that the factory may then be unable to run. In addition, there may be constraints related to latency, privacy and security that can limit the availability of data in the cloud.

Accordingly, there exists a need to improve the processing of data in smart manufacturing environments.

SUMMARY

Aspects and features of the invention are set out in the appended claims.

According to one aspect of an example of the present disclosure, there is provided a system for processing manufacturing data, comprising: an edge device; a cloud platform; a sensing device configured to collect manufacturing data, and to provide the collected data to the edge device; wherein the edge device and the cloud platform are each configured to carry out a plurality of data processing functions on the manufacturing data; the system further comprising a resource manager configured to communicate with the edge devices and with the cloud platform, wherein the resource manager is further configured to: determine whether each of the plurality of data processing functions is to be carried out at the edge device or at the cloud platform; if it is determined that the plurality of data processing functions is to be carried out at the edge device, instruct the edge devices to carry out the plurality of data processing functions; if it is determined that the plurality of data processing functions is to be carried out at the cloud platform, instruct the cloud platform to carry out the plurality of data processing functions; and if it is determined that at least one of the plurality of data processing functions is to be carried out at the edge devices and at least one other data processing function is to be carried out at the cloud platform, instruct the edge device to carry out the at least one of the plurality of data processing functions and instruct the cloud platform to carry out the at least one other data processing function.

The system allows the manufacturing data to be processed either at the edge devices or at the cloud platform. Whether the processing is carried out at the edge device or at the cloud platform may depend on the nature of the data, the user preferences, and the available resources. For example, for stream processing, a stream of data may be processed continuously. Given that the data is processed continuously, the amount of data being processed at any particular point in time may be relatively small. Therefore, the device that processes the data may not require significant processing capacity, meaning that the data processing may be carried out close to the point of data collection (i.e. at the edge device). As an alternative example, for batch processing, a batch of data may be processed, requiring a larger amount of processing capacity. This means that for batch processing, the data may be processed at a location with sufficient processing capacity to handle the amount of data being processed. Therefore, the processing may be carried out at the cloud platform. This is only one example of the allocation of processing between the edge device and the cloud platform. In other examples, the batches of data in batch processing may be relatively small, meaning that batch processing may be performed locally, while stream processing may require the processing of multiple streams of data from multiple sensors, requiring a larger amount of processing capacity (such as at the cloud platform). It will be appreciated that the decision on whether the data is processed at the edge device or at the cloud platform may be based on other parameters, as explained further below.

By processing data either at the edge device or at the cloud platform, the data processing capacity is not as limited as when data is processed only on the factory floor. In addition, the option of processing data at the cloud platform allows data from multiple factory sites to be processed, thereby allowing manufacturing data across multiple manufacturing sites and/or multiple manufacturing lines to be analysed. The option of processing data at the edge device means that data can still be processed in the event that the connection to the cloud is disrupted. In addition, the option of processing data at the edge device allows "mission critical" data to be processed locally, without the latency associated with sending this data to the cloud for processing.

Data can therefore be processed at the edge device or at the cloud platform, depending on the required processing task. For example, mission critical data processing can be carried out at the edge devices (e.g. on the factory floor), while larger-scale batch processing can be carried out at the cloud platform.

The option of processing data either at the edge device or at the cloud platform means that data privacy and security constraints can also be taken into consideration. For example, sensitive data may be processed at the edge device, rather than being sent for processing at a location external to the factory (e.g. at the cloud platform).

In summary, therefore, the option of processing data either at the edge device or at the cloud platform provides the flexibility of drawing on the increased processing resources available at the cloud platform, while providing for the processing of mission critical data on the factory floor and continuity of the data processing capability in the event that the connection to the cloud is disrupted.

The manufacturing data may relate to one or more of: manufacturing equipment, environmental conditions, product quality and material quality, and manufacturing execution (e.g. recipes, production lifecycle, product delivery stage).

The edge device may be configured to carry out the plurality of processing functions using communications software, storage software and analysis software selected from a software set comprising a plurality of communications software, a plurality of storage software and a plurality of analysis software; and the cloud platform may be configured to carry out the plurality of processing functions using communications software, storage software and analysis software selected from the software set.

The use of a consistent software set at the edge device and at the cloud platform allows a processing function to either be carried out at the edge device or at the cloud platform and for that processing function to subsequently be carried out at a different location, without requiring any modification to an application that implements the processing function.

The edge device may be configured to carry out the plurality of processing functions using communications software selected from a software set comprising a plurality of communications software, and the cloud platform may be configured to carry out the plurality of processing functions using communications software selected from the software set.

The edge device may be configured to carry out the plurality of processing functions using storage software selected from a software set comprising a plurality of storage software, and the cloud platform may be configured to carry out the plurality of processing functions using storage software selected from the software set.

The edge device may be configured to carry out the plurality of processing functions using analysis software selected from a software set comprising a plurality of analysis software, and the cloud platform may be configured to carry out the plurality of processing functions using analysis software selected from the software set.

The edge device and the cloud platform may each be configured to carry out the plurality of processing functions using a respective plurality of applications implemented using application code, wherein the application code for an application of the plurality of applications is written such that the application is configured to use any of the communications software, storage software and analysis software in the software set to carry out the processing function.

This means that no modification of the application code is required in order for a processing function to be carried out at either the edge device or the cloud platform. Re-allocation of the processing function to the edge device or the cloud platform additionally requires no modification of the application code.

The edge device may be configured to carry out the plurality of processing functions using communications software, storage software and analysis software; and the cloud platform may be configured to carry out the plurality of processing functions using at least one of: the communications software, the storage software and the analysis software used by the edge device to carry out the plurality of processing functions.

This allows for a simplified implementation in which the same software is used for carrying out the processing function at the edge device and at the cloud platform. This means that the application code can be simplified.

The edge device may be a first edge device, with the system further comprising a second edge device; the second edge device may be configured to carry out the plurality of data processing functions on the manufacturing data; and the resource manager may be configured to: communicate with the second edge device; and determine whether each of the plurality of data processing functions is to be carried out at the first edge device, at the second edge device, or at the cloud platform.

This means that a plurality of edge devices may be used to carry out the data processing functions. Each of the edge devices may be included in the determination made by the resource manager, allowing processing functions to be allocated between the plurality of edge devices, and the cloud platform.

The system may comprise a plurality of edge devices, wherein the plurality of sensing devices is configured to provide the collected data to at least one of the plurality of edge devices, wherein the at least one of the plurality of edge devices is configured to carry out the plurality of data processing functions on the manufacturing data, wherein the resource manager is configured to: communicate with the at least one of the plurality of edge devices; determine whether each of the plurality of data processing functions is to be carried out at the at least one of the plurality of edge devices; if it is determined that the plurality of data processing functions is to be carried out at the at least one of the plurality of edge devices, instruct the at least one of the plurality of edge devices to carry out the plurality of data processing functions, and if it is determined that at least one of the plurality of data processing functions is to be carried out at the at least one of the plurality of edge devices, instruct the at least one of the plurality of edge devices to carry out the at least one of the plurality of data processing functions.

The edge device and the cloud platform may each comprise a plurality of processing modules, each processing module being configured to carry out a respective data processing function of the plurality of data processing functions.

The use of consistent processing modules at the edge device and the cloud platform allows the manufacturing data to be processed in either location. This also allows for dynamic control of the data processing, meaning that a processing function that was previously carried out at the cloud platform can subsequently be carried out at the edge device, because the edge device has the same processing module. This allows the edge device to continue a processing task that is started at the cloud platform.

The resource manager may be configured to determine whether each of the data processing functions is to be carried out at the edge device or at the cloud platform dynamically. The dynamic determination of whether each of the data processing functions is to be carried out at the edge device or at the cloud platform may be a periodic determination. Alternately, the dynamic determination of whether each of the data processing functions is to be carried out at the edge device or at the cloud platform may be an event driven determination. If the resource manager is configured to determine whether each of the data processing functions is to be carried out at the edge device or at the cloud platform in an event driven manner, certain events may trigger the determination made by the resource manager. These events may include, for example, network outage.

The periodic or event-driven determination by the resource manager means that the data processing can be dynamically controlled so that the split in processing between the edge device and the cloud platform can be adjusted over time, so that the data processing can be optimised at a particular time.

The resource manager may be configured to determine whether the data processing function is to be carried out at the edge device or at the cloud platform based on one or more parameters.

This allows a number of parameters to be taken into account in the determination of where the data processing is carried out.

The resource manager may be configured to determine whether the data processing function is to be carried out at the edge device or at the cloud platform based on a plurality of parameters, wherein the determination comprises: formulating a multi-objective optimisation problem based on the plurality of parameters; and solving the multi-objective optimisation problem to determine whether the data processing function is to be carried out at the edge device or at the cloud platform.

This means that the resource manager can take into account multiple parameters in determining the optimal data processing location. The formulation of a multi-objective optimisation problem means that multiple, possibly conflicting, parameters can be considered, with the resource manager being configured to find an optimised solution that accounts for these parameters.

The parameters may include at least one of the computational load at the edge device and the computational load at the cloud platform.

This means that the resource manager can determine an optimised location for processing of the data, taking into account the computational load at the edge device, the cloud platform, or both. For example, if the computational load at the edge device increases above a particular threshold, the resource manager may determine to re-allocate a processing task from the edge device to the cloud platform.

The parameters may include the network behaviour between the edge device and the cloud platform.

This means that the resource manager can determine an optimised location for processing of the data, taking into account the network behaviour between the edge device and the cloud platform. For example, if a natural disaster results in communications links from the factory to the cloud platform being disrupted, then the resource manager may determine to re-allocate a processing task from the cloud platform to the edge device.

The parameters may include a user constraint.

This provides an element of user control in whether data processing is carried out at the edge device or at the cloud platform. For example, a user may require certain data to be processed locally rather than being sent to the cloud platform. Accordingly, user preferences can be factored into the determination of where data is processed.

The user constraint may include a data privacy constraint and/or a data security constraint.

This means that a user is able to control where data is processed based on the privacy and/or security of that data. For example, a user may require sensitive data to be processed locally, or there may be security risks associated with sending certain data to the cloud platform. Therefore, this allows the determination of the optimal location for data processing to account for privacy and/or security considerations.

The parameters may include a data processing performance metric.

This means that desired data processing performance can be taken into account in the determination of the optimal location for data processing. This may be the sole parameter in where a data processing task is carried out, or may be considered in conjunction with other parameters, such as network constraints, computational load, and/or data privacy.

The data processing performance metric may be based on at least one of: a desired data processing fidelity, a desired data throughput, and a desired data processing latency.

The system may further comprise a user interface configured to receive an input from an operator, the input specifying the one or more parameters.

This allows an operator to control the parameters on which the determination of the data processing allocation is based. This means that the operator can change how the allocation of the data processing functions is determined over time.

The resource manager may comprise a first resource manager module and a second resource manager module, the first resource manager module being configured to run at the cloud platform, and the second resource manager module being configured to run at the edge device; and each of the first resource manager module and the second resource manager module may be configured to determine whether each of the plurality of data processing functions is to be carried out at the edge device or at the cloud platform.

This allows the resource manager to determine, at the cloud platform, the allocation of processing functions between the edge device and the cloud platform. However, if the cloud platform is unavailable (for example, due to network outage), then the additional resource manager module at the edge device allows this determination to continue to be made. Therefore, the system provides for the determination of the allocation of processing functions between the edge device and the cloud platform to be made using the computing resources of the cloud platform, but includes the redundancy to continue to make this determination in the event that the cloud platform is not available.

In an aspect, the system may comprise an edge device; a sensing device configured to collect manufacturing data and to provide the collected data to the edge device; wherein the edge device is configured to carry out a plurality of data processing functions on the manufacturing data that can also be carried out at a cloud platform; the system further comprising a resource manager configured to communicate with the edge device and with the cloud platform, wherein the resource manager is further configured to: determine whether each of the plurality of data processing functions is to be carried out at the edge device or at the cloud platform; if it is determined that the plurality of data processing functions is to be carried out at the edge device, instruct the edge device to carry out the plurality of data processing functions; if it is determined that the plurality of data processing functions is to be carried out at the cloud platform, instruct the cloud platform to carry out the plurality of data processing functions; and if it is determined that at least one of the plurality of data processing functions is to be carried out at the edge device and at least one other data processing function is to be carried out at the cloud platform, instruct the edge device to carry out the at least one of the plurality of data processing functions and instruct the cloud platform to carry out the at least one other data processing function.

According to another aspect of an example of the present disclosure, there is provided a resource manager for determining the allocation of manufacturing data processing functions, the resource manager being configured to communicate with an edge device and with a cloud platform, each of the edge device and the cloud platform being configured to carry out a plurality of data processing functions on the manufacturing data, the resource manager comprising: an optimisation engine configured to determine whether each of the plurality of data processing functions is to be carried out at the edge device or at the cloud platform; and an allocation engine configured to: instruct the edge device to carry out the plurality of data processing functions, if the optimisation engine determines that the plurality of data processing functions is to be carried out at the edge device; instruct the cloud platform to carry out the plurality of data processing functions, if the optimisation engine determines that the plurality of data processing functions is to be carried out at the cloud platform; and instruct the edge device to carry out at least one of the plurality of data processing functions and instruct the cloud platform to carry out at least one other data processing function, if the optimisation engine determines that the at least one of the plurality of data processing functions is to be carried out at the edge device and the at least one other data processing function is to be carried out at the cloud platform.

According to another aspect of an example of the present disclosure, there is provided a computer-implemented method for processing manufacturing data, the method being implemented by a resource manager configured to communicate with an edge device and with a cloud platform, each of the edge device and the cloud platform being configured to carry out a plurality of data processing functions on the manufacturing data, the method comprising: determining whether each of the plurality of data processing functions is to be carried out at the edge device or at the cloud platform; responsive to determining that the plurality of data processing functions is to be carried out at the edge device, instructing the edge device to carry out the plurality of data processing functions; responsive to determining that the plurality of data processing functions is to be carried out at the cloud platform, instructing the cloud platform to carry out the plurality of data processing functions; and responsive to determining that at least one of the plurality of data processing functions is to be carried out at the edge device and at least one other data processing function is to be carried out at the cloud platform, instructing the edge device to carry out the at least one of the plurality of data processing functions and instructing the cloud platform to carry out the at least one other data processing function.

According to a further aspect of an example of the present disclosure, there is provided a computer-readable medium comprising computer-executable instructions that, when executed by a processor of a computing device, cause the computing device to perform the above method.

BRIEF DESCRIPTION OF FIGURES

Specific embodiments are described below by way of example only and with reference to the accompanying drawings, in which.

DETAILED DESCRIPTION

As mentioned herein, an "edge device" is a computing device that is configured to receive data collected by a sensing device and to send that data to a separate computing device (such as a cloud platform) over a network, for processing. The edge device is also configured to process the data collected by the sensing device. The edge device is therefore in the vicinity of the sensing device such that the sensing device can send collected data to the edge device.

As mentioned herein, a "cloud platform" is a pool of computing devices, typically located remotely from the edge device. The processing and communication capabilities of the computing devices is pooled, such that communication, storage and processing is carried out by "virtual" devices, with the amount of virtual processing capacity allocated from the pool of computing devices being dependent on the processing requirement.

Figure 1:
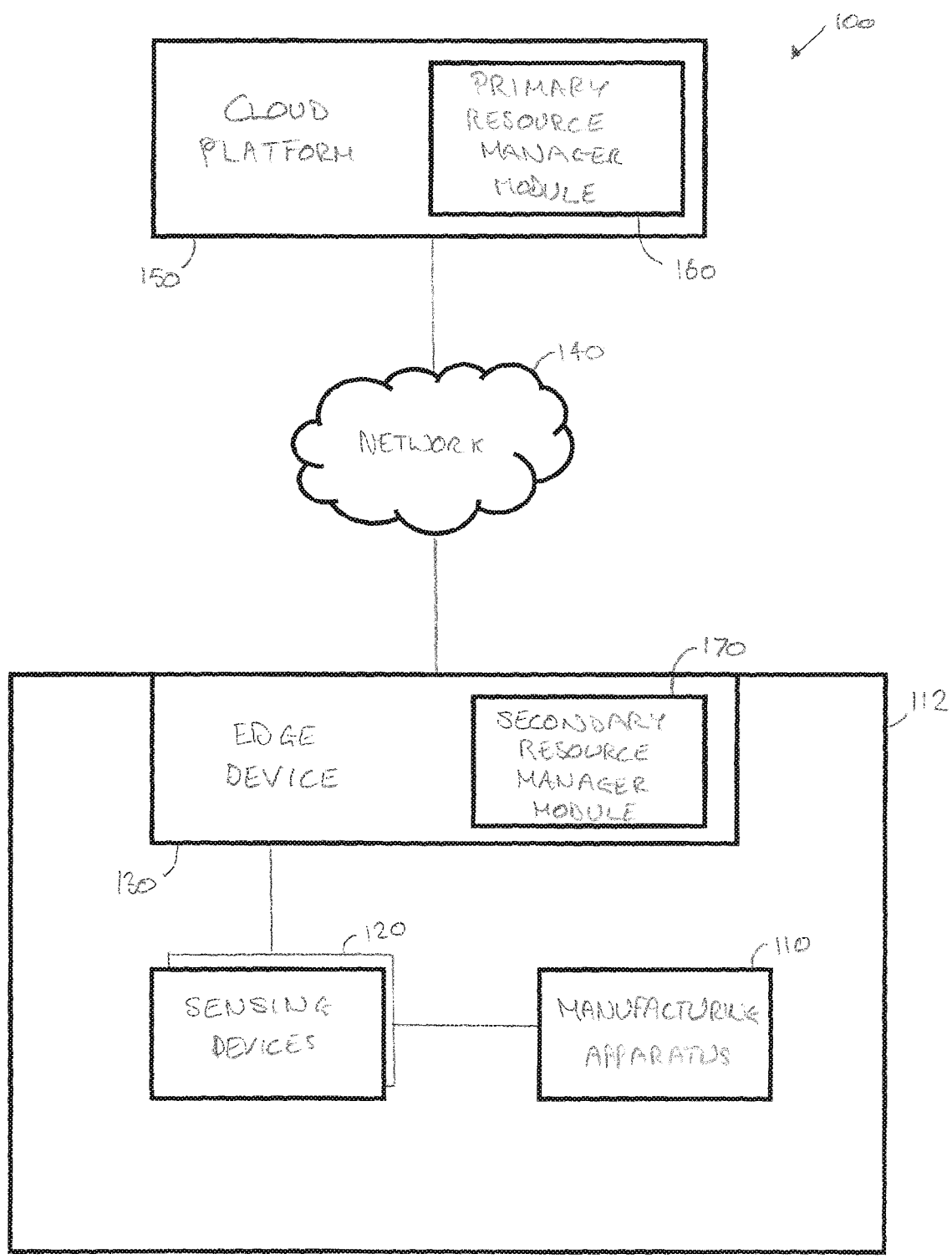
FIG. 1 is a schematic overview of a system for processing manufacturing data.

FIG. 1 shows an overview of the manufacturing data processing system 100. The system 100 comprises a sensing device 120 which collects manufacturing data. In one example, the manufacturing data is associated with a manufacturing apparatus 110 installed at a point in a manufacturing assembly line on a factory floor 112. For example, the manufacturing apparatus 110 may be a plastics extruder used to apply a plastic coating to a wire.

Optionally, data associated with the manufacturing apparatus 110 may be collected by a plurality of sensing devices 120. Continuing the above example of the plastics extruder, one of the sensing devices 120 may collect data on the operating speed of the plastics extruder, and another of the sensing devices 120 may collect data on the melt temperature of the material being processed by the plastics extruder.

Another sensing device 120 can collect information about the environmental conditions within the factory, such as the level of humidity. Finally, a different sensing device 120 can collect measurements on the actual diameter of material coated by the extruder.

Each sensing device 120 may be part of the manufacturing apparatus 110 (i.e. integral to the manufacturing apparatus 110) or may be a separate device. The sensing devices 120 may be implemented as Internet of Things devices, each having a sensor configured to collect data, and a means of transmitting the collected data to another device for processing.

The system 100 also comprises an edge device 130. Each sensing device 120 may be configured to provide the collected data to an edge device 130 for processing.

The edge device 130 is configured to carry out a plurality of data processing functions on the manufacturing data. In one example, the edge device 130 is configured to receive data from the sensing devices 120 (for example, via a wireless communications interface), and to carry out a plurality of data processing functions on the data received from the sensing devices 120.

The edge device 130 may be implemented as a central device on the factory floor 112. Alternatively, the edge device 130 may be implemented in some other location in the vicinity of the manufacturing apparatus 110, such that it can receive data from the sensing devices 120. As a further alternative, the functionality of the edge device 130 may be distributed among the sensing devices 120 (that is, the sensing devices 120 can carry out the processing functions of the edge device 130).

The system also comprises a cloud platform 150. In one example, the edge device 130 is configured to communicate with a cloud platform 150 via a network 140 such as the Internet. The edge device 130 may be configured to send data collected by the sensing devices 120 to the cloud platform 150 for processing, unless there are constraints on where certain data is processed (for example, a security constraint requiring data to be processed at the edge device 130).

The cloud platform 150 is also configured to carry out the plurality of data processing functions on the manufacturing data. For example, the cloud platform 120 is configured to carry out the plurality of data processing functions on the data received from the sensing devices 120. That is, the edge device 130 and the cloud platform 150 may both be configured to carry out the same processing functions on the data received from the sensing devices 120.

Continuing the above example of sending data associated with a plastics extruder, based on desired tolerances for the diameter of the plastic coating applied to the wire by the extruder, the data collected by the sensing devices 120 needs to be continuously analysed to understand if the produced coating has a diameter within tolerance. The data may also be analysed to determine the appropriate speed for the extruder to account for variations in the material properties, as well as the environmental conditions. The types of data processing can include data cleaning, synchronization, continuous comparison against desired thresholds, and finally optimisation using a mathematical model to determine the appropriate operating speed of the plastics extruder.

It will be appreciated that the optimisation of the speed of the plastics extruder is given by way of example only. The sensing devices 120 are configured to collect data on various data relating to the manufacturing apparatus 110, environmental conditions within the factory, product quality and material quality, or any other data relating to the manufacturing process.

The system 100 also comprises a resource manager 500 (shown in FIG. 5) which is configured to communicate with the edge device 130 and the cloud platform 150. The resource manager 500 is configured to determine whether the each of the plurality of data processing functions is to be carried out at the edge device 130 or at the cloud platform 150.

If the resource manager 500 determines that the plurality of data processing functions is to be carried out at the edge device 130, the resource manager 500 instructs the edge device 130 to carry out the plurality of data processing functions.

If the resource manager 500 determines that the plurality of data processing functions is to be carried out at the cloud platform 150, the resource manager 500 instructs the cloud platform 150 to carry out the plurality of data processing functions.

If the resource manager 500 determines that at least one of the plurality of data processing functions is to be carried out at the edge device 130 and at least one other one of the data processing functions is to be carried out at the cloud platform 150, the resource manager 500 instructs the edge device 130 to carry out the at least one of the plurality of data processing functions. The resource manager 500 also instructs the cloud platform 150 to carry out the at least one other one of the plurality of data processing functions.

In one example, the resource manager 500 is implemented using two modules: a primary resource manager module 160, which is implemented at the cloud platform 150; and a secondary resource manager module 170, which is implemented at the edge device 130.

The primary resource manager module 160 carries out the functions of the resource manager 500, provided that the communications link from the edge device 130 to the cloud platform 150 is not interrupted. If the communications link between the edge device 130 and the cloud platform 150 is interrupted, the secondary resource manager module 170 carries out the functions of the resource manager 500.

Alternatively, the functions of the resource manager 500 may be carried out by a separate computing device. For example, a separate edge device may be used to implement the resource manager 500. Alternatively, the resource manager 500 may be implemented in the cloud, either at the cloud platform 150 or separately.

The resource manager 500 determines whether the plurality of processing functions is to be carried out at the edge device 130 or at the cloud platform 150. In some examples, the edge device 130 and the cloud platform 150 may each be configured to carry out a single processing function. In this case, the resource manager 500 determines whether the processing function is to be carried out at the edge device 130, or whether the processing function is to be carried out at the cloud platform 150.

In one example, a first subset of processing functions may only be carried out at the edge device 130, a second subset processing functions may only be carried out at the cloud platform 150, and a third subset of processing functions may be carried out either at the edge device 130 or at the cloud platform 150. That is, the edge device 130 may be configured to carry out the first and third subsets of processing functions, and the cloud platform 150 may be configured to carry out the second and third subsets of processing functions. In this case, the resource manager 500 determines whether all of the third subset of processing functions are to be carried out at the edge device 130, whether all of the third subset of processing functions are to be carried out at the cloud platform 150, or whether some of the third subset of processing functions are to be carried out at the edge device 130 and the remaining processing functions of the third subset are to be carried out at the cloud platform 150.

In one example, the resource manager 500 is configured to determine where processing functions are to be carried out based on one or more parameters. These parameters may include parameters relating to the edge device 130 and the cloud platform 150 (such as computational load), parameters relating to the communications link between the edge device 130 and the cloud platform 150 (such as network behaviour), parameters relating to constraints on where the data can be processed (such as data privacy or security constraints), and/or parameters relating to data processing performance (such as data processing fidelity, data processing throughput, and data processing latency).

The result of the processing function may be dependent on where the processing function is carried out. The edge device 130 may have limited processing capacity for the reasons discussed above, and may therefore be restricted to processing a certain amount (or "window") of data. The increased processing capability of the cloud platform 150 may allow a larger window of data to be processed. Another consequence is that the fidelity of the data processing (i.e. the data processing accuracy) may be different between the cloud platform 150 and the edge device 130. In this case, the outcome of the processing at the cloud platform 150 may have a higher fidelity than the outcome of the processing at the edge device 130. Therefore, whether the processing function is carried out at the edge device 130 or at the cloud platform 150 may depend on the amount of data being processed, and the desired fidelity of results. As an example, the optimisation of the speed of the manufacturing apparatus 110 based on material properties and environmental conditions may use a history of observed data to make an appropriate determination of the operating speed. If this determination is made at the edge device 130, a smaller amount of data (i.e. a more limited history) is available because of the computational constraints at the edge device 130. For example, the history data may be sub-sampled. Therefore, the optimisation of the operating speed may not be as accurate as if the optimisation were carried out at the cloud platform 150, where the full history of observed data may be available.

If the determination of where the processing functions are to be carried out is based on a single parameter, the resource manager 500 may formulate an optimisation problem based on that parameter and solve the optimisation problem to determine whether the processing functions are to be carried out at the edge device 130 or at the cloud platform 150.

If the determination of where the processing functions are to be carried out is based on two or more parameters, the resource manager 500 may formulate a multi-objective optimisation problem based on the two or more parameters. The resource manager 500 may then solve the multi-objective optimisation problem in order to determine whether the processing functions are to be carried out at the edge device 130 or at the cloud platform 150.

In one example, the resource manager 500 is configured to determine where the processing functions are carried out dynamically. This means that the resource manager 500 can account for changes in the parameters used in the optimisation problem over time. The dynamic determination of where the processing function is to be carried out may, for example, be carried out every 24 hours, upon request from an operator, or in response to a change to the system 100 (such as the cloud platform 150 becoming temporarily unavailable). For example, an operator may initiate the dynamic determination by the resource manager 500 after the operator has changed a constraint associated with the processing function (for example, a constraint on the privacy of the data), or after the operator has adjusted a parameter relating to the data processing performance (such as a desired data processing latency). Alternately, the dynamic determination of where the processing function is to be carried out may be event driven, where an event such as slow network, or network outage automatically triggers a new optimisation.

In order to be able to carry out the same processing functions, the edge device 130 and the cloud platform 150 may be configured with a consistent set of communication, storage and analysis software. That is, at both the edge device 130 and the cloud platform 150, communication software, storage software and analysis software may be installed. The communication software may allow different processing components to communicate data and results with each other over a network or using shared memory and caches. The storage software may provide persistence mechanisms for the data and allow multiple processing components to write/read and modify the data being stored. The analysis software may be used to access either stored data or streaming data (or both) and to process the data in a certain manner in order to extract some insight from it (for example, an optimal speed of the plastics extruder). The analysis software may make available the results of the analysis for additional programming.

The software installed at the edge device 130 may be compatible with the software installed at the cloud platform 150. The compatibility of the software installed at the edge device 130 and at the cloud platform 150 may be achieved by implementing an identical stack of storage and analysis components at the edge device 130 and at the cloud platform 150. Alternatively, a controlled software set comprising a plurality of communication, storage and analysis software may be implemented at the cloud platform and at the edge device 130. In this case, a processing function is configured to use communication, storage and analysis software from within the software set, depending on whether the processing function is carried out either at the edge device 130 or at the cloud platform 150.

The compatibility of the software allows a processing function to be executed either at the edge device 130 or at the cloud platform 150. Subsequent processing functions may then be executed at a different location (for example, at the edge device 130 if the initial processing function was carried out at the cloud platform 150). These subsequent processing functions can be carried out without any additional processing requirement to ensure compatibility between the cloud platform 150 and the edge device 130. This is because the edge device 130 is able to read the data stored by the cloud platform 150, and to carry out the same processing that would be carried out at the cloud platform 150, because of the compatible communication, storage and analysis software.

Compatible middleware may be installed at the cloud platform 150 and the edge device 130 in order to provide compatibility of the storage, computation and analysis software. In addition, the same operating system may be installed at the cloud platform 150 and the edge device 130.

The processing functions executed by the edge device 130 and the cloud platform 150 may be written in application code. The application code for a processing function may be written such that it is configured to use the communication, storage and analysis software installed at the edge device 130 or the communication, storage and analysis software at the cloud platform 150, depending on where the processing function is determined to be carried out. In particular, if a consistent software set comprising a plurality of communication, storage and analysis software is implemented at the edge device 130 and at the cloud platform 150, the application code for a processing function may be written such that it is configured to use any of the communication, storage and analysis software in the software set. The application code for a processing function may therefore be written such that the communication, storage and analysis software utilised when the processing function is carried out at the edge device 130 differ from the communication, storage and analysis software utilised when the processing function is carried out at the cloud platform 150, provided that the communication, storage and analysis software utilised at each location are within the consistent software set implemented at the edge device 130 and at the cloud platform 150.

Although a single edge device 130 has been referred to in the examples explained above, it will be appreciated that a plurality of edge devices 130 may be implemented. In this case, one or more of the plurality of edge devices 130 may be configured to carry out one or more data processing functions. If it is determined that a first data processing function is to be carried out at one or more of the edge devices 130, the first data processing function may be carried out at one of the plurality of edge devices 130. If it is determined that a second data processing function is to be carried out at one or more of the edge devices 130, the second data processing function may be carried out at another one of the plurality of edge devices 130, or at the same one of the plurality of edge devices 130. Alternatively, the first and second data processing functions may be carried out at two or more of the plurality of edge devices 130, with the two or more edge devices 130 used for carrying out the first data processing function either overlapping with or being distinct from the two or more edge devices 130 used for carrying out the second data processing function.

If a plurality of edge devices 130 are implemented for carrying out the plurality of processing functions, then the resource manager 500 may take the plurality of edge devices 130 into account when determining where processing functions are to be carried out. As one example, if there are two edge devices 130 (referred to in this example as a first edge device and a second edge device), the resource manager 500 may determine whether each of the plurality of data processing functions is to be carried out at the first edge device, at the second edge device, or at the cloud platform. The plurality of edge devices 130 may be taken into account in the optimisation problem formulated by the resource manager 500. If the system includes more than two edge devices 130, each edge device 130 may be taken into account in the optimisation problem formulated by the resource manager 500.

If a cloud platform (such as the cloud platform 150) does not require configuration in order to carry out the plurality of processing functions, then the system 100 may comprise the sensing device 120, the edge device 130 and the resource manager 500 (i.e. not the cloud platform 150). The sensing device 120 may be configured to collect manufacturing data and to provide the collected data to the edge device 130. In this case, the edge device 130 may be configured to carry out a plurality of data processing functions that can also be carried out at the cloud platform. The resource manager 500 may be configured to communicate with the edge device 130 and with the cloud platform. The resource manager 500 may further be configured to: determine whether each of the plurality of data processing functions is to be carried out at the edge device 130 or at the cloud platform; if it is determined that the plurality of data processing functions is to be carried out at the edge device 130, instruct the edge device 130 to carry out the plurality of data processing functions; if it is determined that the plurality of data processing functions is to be carried out at the cloud platform, instruct the cloud platform to carry out the plurality of data processing functions; and if it is determined that at least one of the plurality of data processing functions is to be carried out at the edge device 130 and at least one other data processing function is to be carried out at the cloud platform, instruct the edge device 130 to carry out the at least one of the plurality of data processing functions and instruct the cloud platform to carry out the at least one other data processing function.

Figure 2:
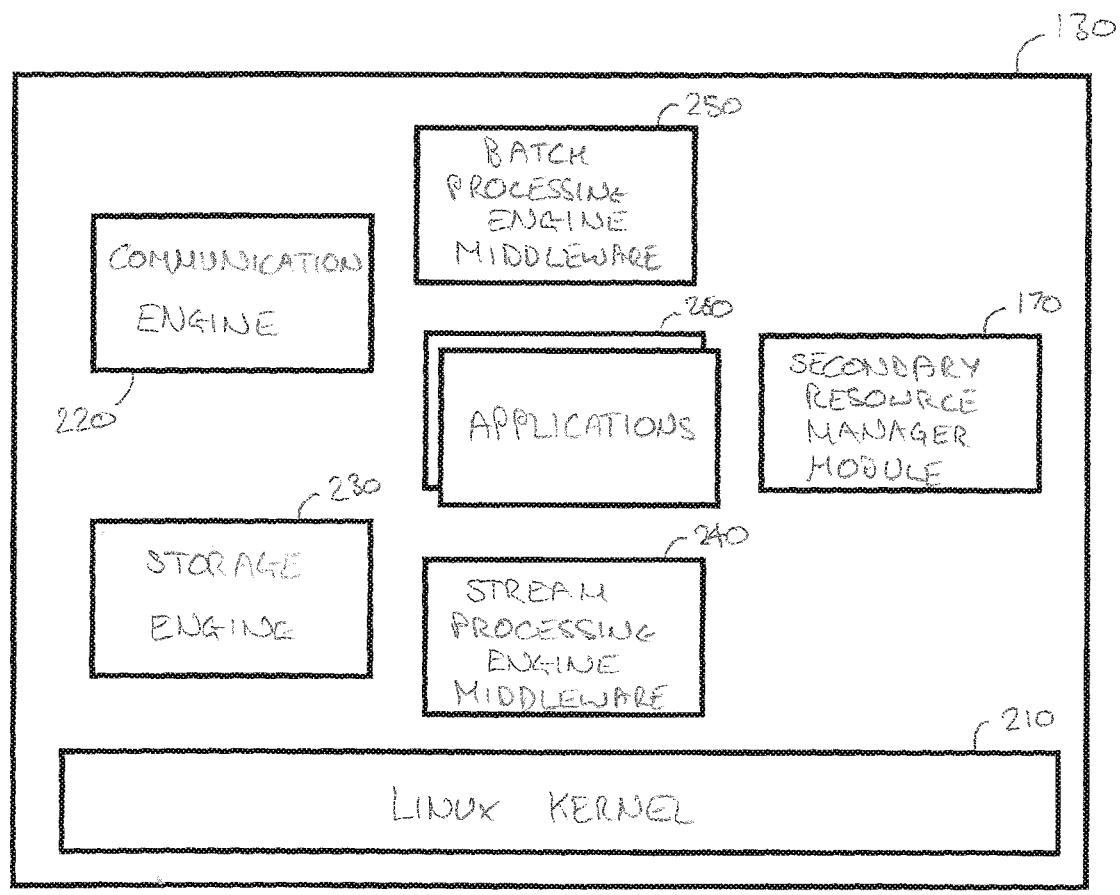
FIG. 2 is a schematic diagram of an edge device used in the system shown in FIG. 1.

An example implementation of the edge device 130 is shown in FIG. 2. As shown in FIG. 2, the edge device 130 may run on the Linux kernel 210. The edge device 130 may comprise a communication engine 220, a storage engine 230, stream processing engine middleware 240, batch processing engine middleware 250, and a plurality of applications 260, each of which may be implemented in software configured to run on a processor of the edge device 130. If the resource manager 500 is implemented using the primary resource manager module 160 and the secondary resource manager module 170, the edge device 130 may also comprise the secondary resource manager module 170.

The communication engine 220 may be configured to receive data from the sensing devices 120, and to send and receive data from the cloud platform 150 over the network 140. The storage engine 230 may be configured to store data for processing at the edge device 130.

The stream processing engine middleware 240 may be configured to host components that implement stream processing for the processing of a continuous stream of data received from the sensing devices 120. For example, the stream processing engine middleware 240 may support processing of incoming data from the sensing devices 120 (or a stream of data on which a processing function has previously been carried out at the edge device 130 or the cloud platform 150) in order to provide a real-time metric to an operator. Data received from the sensing devices 120 may be stored in a cache (not shown) by the storage engine 230 prior to processing.

The batch processing engine middleware 250 may be configured to host components that implement batch processing to a batch of data received from the sensing devices 120 (or stored data on which a processing function has previously been carried out at the edge device 130 or the cloud platform 150). For example, the batch processing engine middleware 250 may implement processing of data received over an eight-hour period, or data from multiple manufacturing lines. Prior to processing by the batch processing engine middleware 250, data may be stored by the storage engine 230.

Each of the applications 260 may be associated with a particular processing function. Each application 260 may be stored in an application code container. The application code may be written so that it can access the data stored by the storage engine 230, and so that it can send data and/or receive data via the communication engine 220. The application code may be written so that it can process data both in accordance with the batch processing runtimes and in accordance with the stream processing runtimes.

In addition, the application code may be written so that it can process data at different temporal granularities, in order to produce results at different granularities. For example, if a batch processing function is to be carried out at the edge device 130, the processing capacity for the processing function may be more limited than if the batch processing function were carried out at the cloud platform 150. Therefore, the application 260 may sample the batch of data in order to reduce the processing capacity required to carry out the processing function.

The secondary resource manager module 170 may determine where the processing function is to be carried out in the event that the primary resource manager module 160 (implemented at the cloud platform 150) is unavailable. This process is described further below.

Figure 3:
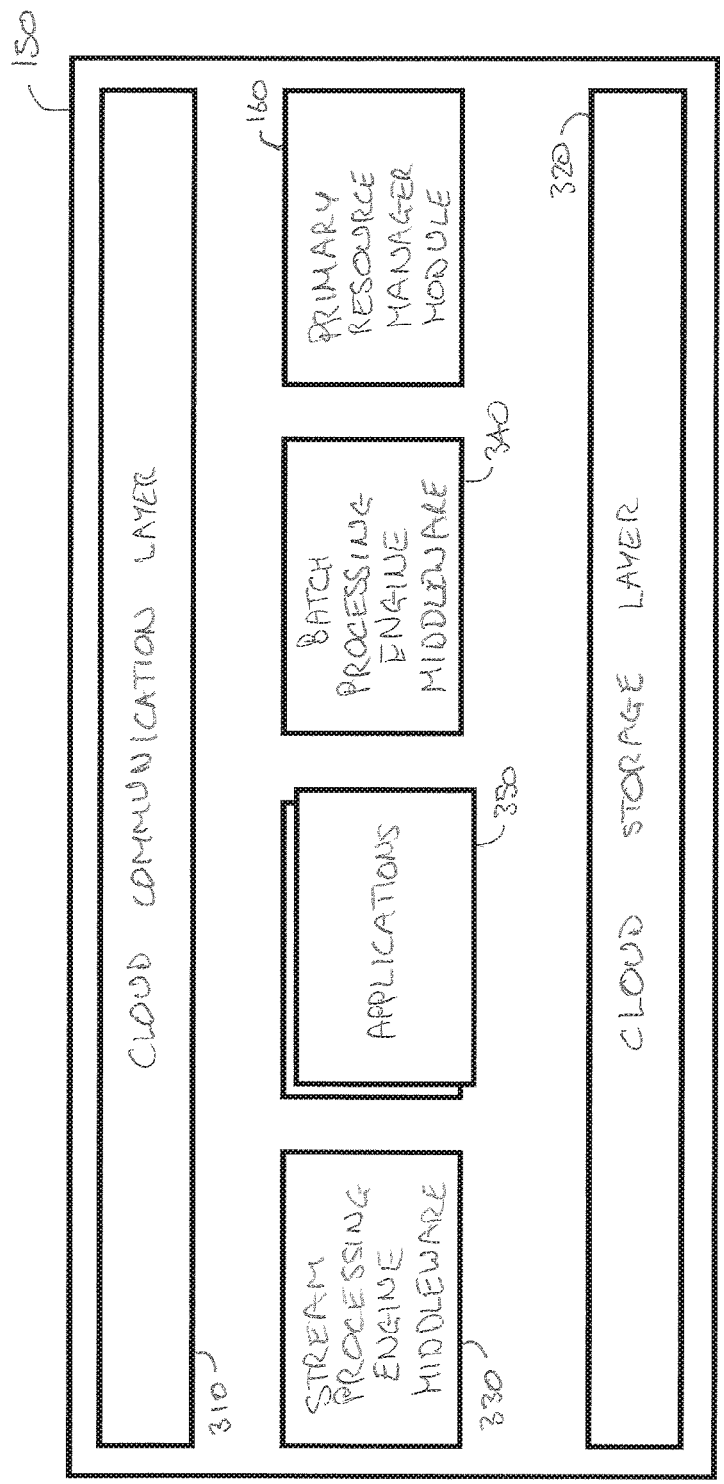
FIG. 3 is a schematic diagram of a cloud platform used in the system shown in FIG. 1.

An example implementation of the cloud platform 150 is shown in FIG. 3. As shown in FIG. 3, the cloud platform 150 may include a cloud communication layer 310, a cloud storage layer 320, stream processing engine middleware 330, batch processing engine middleware 340, and a plurality of applications 350. If the resource manager 500 is implemented using the primary resource manager module 160 and the secondary resource manager module 170, the cloud platform 150 may also comprise the primary resource manager module 160.

The cloud communication layer 310 may be configured to allow data to be sent and received from the cloud platform 150 to the edge device 130 over the network 140. The cloud storage layer 320 may be configured to allow data to be stored for processing at the cloud platform 150.

The stream processing engine middleware 330 may be configured to host components that implement stream processing of a continuous stream of data received from the sensing devices 120, via the edge device 130 (or a stream of data on which a processing function has previously been carried out at the edge device 130 or the cloud platform 150). The batch processing engine middleware 340 may be configured to host components that implement batch processing of a batch of data received from the sensing devices 120, via the edge device 130 (or stored data on which a processing function has previously been carried out at the edge device 130 or the cloud platform 150).

As with the applications 260 implemented at the edge device 130, each of the applications 350 may be associated with a particular processing function. Each application 350 may be stored in an application code container. The application code may be written so that it can access the data stored in the cloud storage layer 320, and so that it can send data and/or receive data via the cloud communication layer 310. The application code may be written so that it can process data both in accordance with the batch processing runtimes and in accordance with the stream processing runtimes.

The primary resource manager 160 module may determine where the processing function is to be carried out, unless the communications link between the cloud platform 150 and the edge device 130 is disrupted. This process is described further below.

Figure 4:
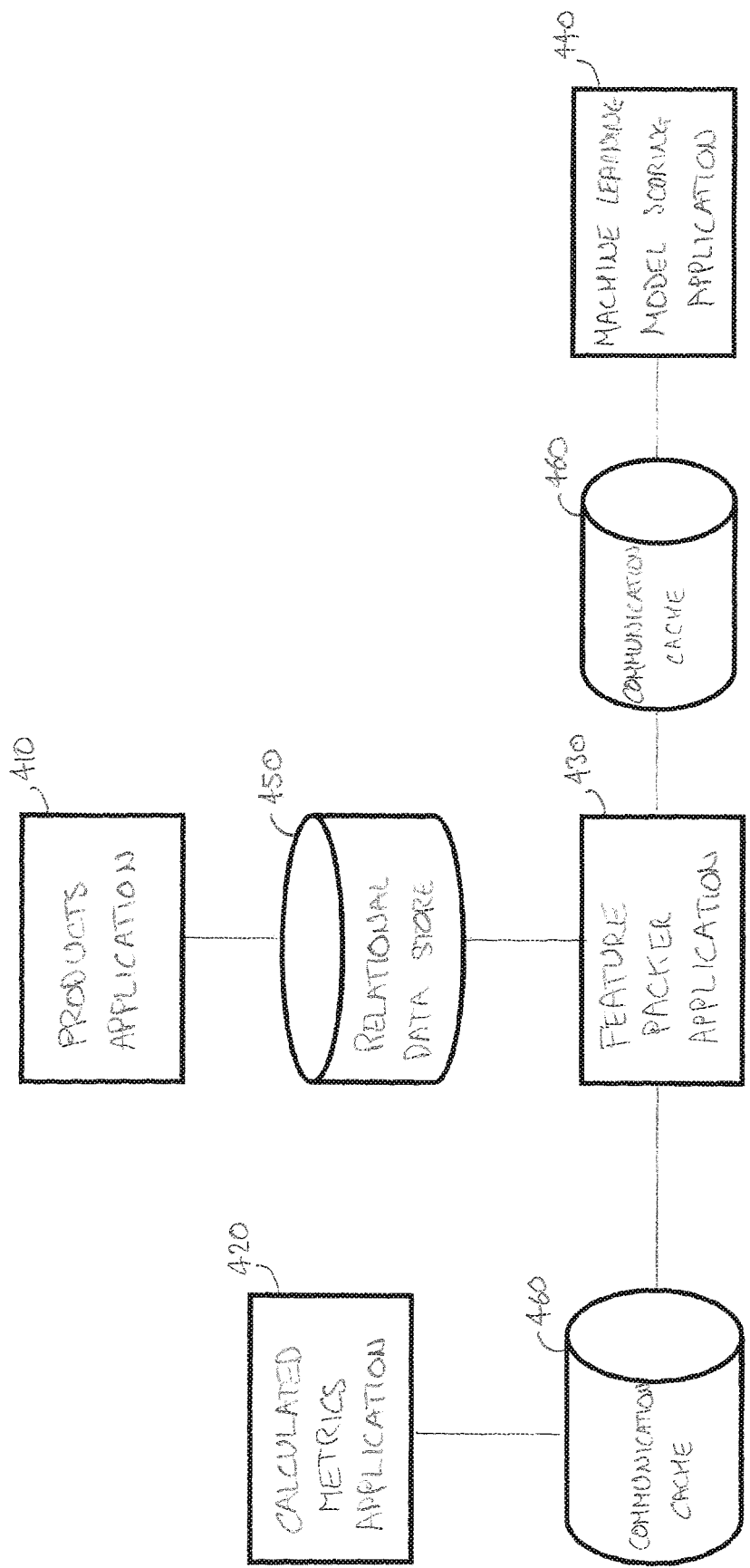
FIG. 4 is a schematic diagram showing applications that can be run either at the edge device or at the cloud platform.

An example implementation of processing manufacturing data using four applications 130 is shown in FIG. 4. The four applications are a products application 410, a calculated metrics application 420, a feature packer application 430, and a machine learning model scoring application 440.

The products application 410 may track which products are being manufactured at a particular point in time. The output from the products application 410 may be stored in a relational data store 450. The calculated metrics application 420 may compute a range of aggregates and functions on the raw data received from the sensing devices 120, and provide outputs to a communication cache 460. The feature packer application 430 may take, as inputs, the outputs from the products application 410 and the calculated metrics application 420 (i.e. from the relational data store 450 and the communication cache 460, respectively), and create features that are needed by the predictive machine learning model deployed inside the machine learning model scoring application 440. The feature packer application 430 may output to the communication cache 460.

The machine learning model scoring application 440 may then take these features as input to create predictions of possible values in the future. In the case of the example with the plastics extruder, the machine learning model scoring application 440 can be used to generate predictions of possible future values of the resulting diameter of the plastic coating applied to the wire based on the current speed, environmental conditions and properties of the material. This prediction can then be leveraged by an operator or by the optimisation process to determine an appropriate setting for the extruder speed.

In this example, each of the applications may be configured to communicate with the other applications via either the communication cache 460, or the relational data store 450.

In one example, at the edge device 130, Redis is used as the communication cache 460 and MySQL is used as the relational data store 450. At the cloud platform 150, Pub-sub may be used for communication and Postgres may be used for relational data storage. This means that each of the applications is configured to use both Redis and Pub-sub for communication. When the application is carried out at the edge device 130, the application may use Redis for communication, whereas when the application is carried out at the cloud platform 150, Pub-sub may be used for communication. To read/write to both Redis and Pub-sub, both Redis and Pub-sub APIs may be integrated into the applications. Similarly, for data storage, each of the applications in this example may be configured to use both MySQL and Postgres for storage.

When run at the cloud platform 150, the feature packer application 430 can aggregate across a large amount of data to create the features needed by the model. However, at the edge device 130, the feature packer application may aggregate data over a smaller data window due to memory constraints. Therefore, when the feature packer application 430 is run at the cloud platform 150, the feature vectors produced by the feature packer application 430 may have a higher level of fidelity compared with those produced by the feature packer application 430 when it is run at the edge device 130. However, regardless of where the feature packer application 430 is run, the outputs from the feature packer application 430 can be used by the machine learning model scoring application 440 to generate appropriate results (e.g. predictions), albeit with potentially slightly lower accuracy when run at the edge device 130.

The feature packer application 430 and the machine learning model scoring application 440 may be designed to operate on streaming data. In one example, the feature packer application 430 and the machine learning model scoring application 440 are built on top of a common stream processing middleware using Apache Beam. In one example, at the cloud platform 150, the Apache Beam DataFlow Runner (i.e. a distributed system for stream processing) may be used, whereas at the edge device 130, Apache Beam DirectRunner may be used to account for the limited availability of compute and memory resources. No modification of application code is required for the applications 260, 350 to be run at either the edge device 130 or the cloud platform 150. This allows the determination of where to run the application 260, 350 to be determined at run-time by the resource manager 500.

Figure 5:
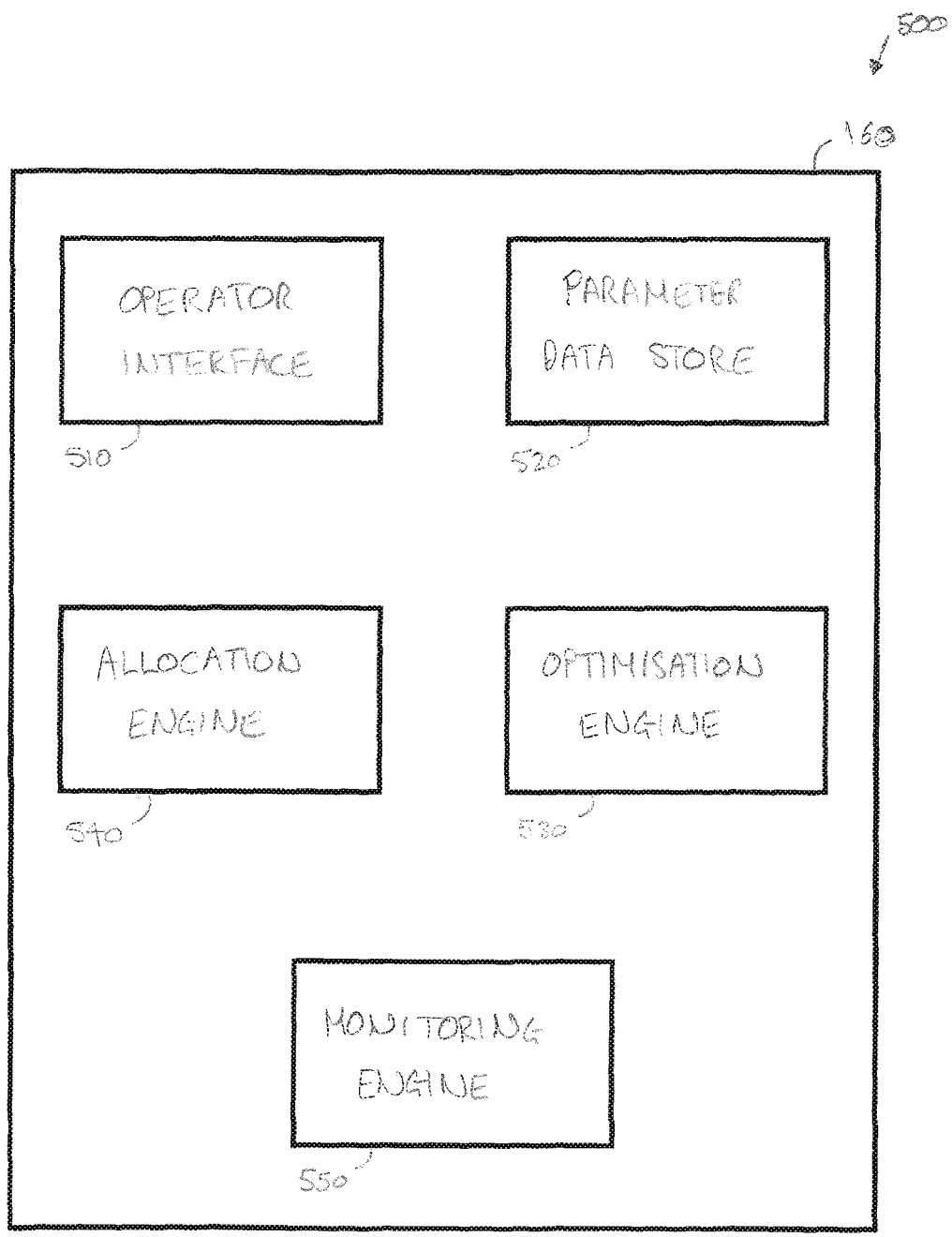
FIG. 5 is a schematic diagram of a resource manager used in the system shown in FIG. 1.

An example implementation of the resource manager 500 is shown in FIG. 5. The resource manager comprises an optimisation engine 530 and an allocation engine 540. The resource manager is configured to determine the allocation of manufacturing data processing functions. The resource manager 500 is configured to communicate with an edge device (for example, edge device 130) and with a cloud platform (for example, cloud platform 150). Each of the edge device and the cloud platform are configured to carry out a plurality of data processing functions on the manufacturing data.

The optimisation engine 530 is configured to determine whether each of the plurality of data processing functions is to be carried out at the edge device or at the cloud platform.

The allocation engine 540 is configured to instruct the edge device to carry out the plurality of data processing functions, if the optimisation engine 530 determines that the plurality of data processing functions is to be carried out at the edge device. The allocation engine 540 is configured to instruct the cloud platform to carry out the plurality of data processing functions, if the optimisation engine 530 determines that the plurality of data processing functions is to be carried out at the cloud platform. The allocation engine 540 is configured to instruct the edge device to carry out at least one of the plurality of data processing functions and instruct the cloud platform to carry out at least one other data processing function, if the optimisation engine 530 determines that the at least one of the plurality of data processing functions is to be carried out at the edge device and the at least one other data processing function is to be carried out at the cloud platform.

As explained above, the resource manager 500 may comprise a primary resource manager module 160 which may be implemented at the cloud platform 150, and a secondary resource manager module 170 which may be implemented at the edge device 130. The functions of the primary 160 and secondary 170 resource manager modules may be identical, so only the primary resource manager module 160 is shown in FIG. 5.

The primary resource manager module 160 may comprise an operator interface 510. The operator interface 510 may be configured to receive operator input on the parameters to be used in the multi-objective optimisation problem (for example, desired performance metrics such as a desired processing latency, or constraints such as data privacy).

The parameters received using the operator interface 510 may then be stored in a parameter data store 520 which may be accessible by the optimisation engine 530.

The optimisation engine 530 at the primary resource manager module 160 (and, as discussed above, the secondary resource manager module) may be configured to formulate and solve a multi-objective optimisation problem. One example of the way in which the optimisation engine 530 formulates the optimisation problem is given below.

Consider that there are N applications, and M available devices (including the cloud platform 150).

Let us define the following indicator variables $a_{ij} \in \{0,1\}$ for $1 \leq i \leq N$ and $1 \leq j \leq M$ where $a_{ij}=1$. This means that application i is allocated to run on device j.

Now, variables $v_{ij}$ can be defined, which correspond to the value derived from running application i when it runs on device j. These variables can be adjusted to account for desired privacy or security concerns, in accordance with the parameters stored in the parameter data store 520. For instance, if an application cannot be run at the cloud platform 150, $v_{iM}$ can be set to 0, or in the extreme case, $v_{iM}<0$.

Similarly, $c_{ij}$ is defined as the cost of running application i on device j. This may also vary depending on whether the application is running at the edge device 130 or at the cloud platform 150. The cost can include many parameters, including computational, memory, network and storage constraints, as defined by the parameters stored in the parameter data store 520.

An optimisation problem can then be formulated as:

$$\max_{a_{ij}} \sum_{i=1}^{N} \sum_{j=1}^{M} a_{ij} \times v_{ij}$$

$$\text{s.t.} \sum_{j=1}^{M} a_{ij} \leq 1$$

$$\sum_{i=1}^{N} a_{ij} \times c_{ij} \leq C_j$$

The first constraint indicates that there can be at most one instance of an application. The second constraint indicates that the cost budget of any device (denoted as $C_j$) cannot be exceeded.

In some cases, additional constraints can be added when there are coupled applications (i.e. applications that need to run together in the same location). For instance, if application i and application k are coupled, then there is the additional constraint:

$$a_{ij}=a_{kj} \forall j$$

So far, a static optimisation problem has been described. However, in practice, the problem may have several dynamics, with the cost and value of the applications changing based on time varying properties of the end to end system and environment. For instance, if the network 140 connecting the factory floor 112 to the cloud platform 150 goes down, then there is no value to running the applications on the cloud platform 150. Instead, as many applications as possible need to be run at the edge device 130.

Hence, $v_{ij}(t)$ and $c_{ij}(t)$ can be defined as the time varying value and the time varying cost, respectively. The optimisation engine 530 can use the latest estimate of these costs and values (based on the parameters stored in the parameter data store 520) to determine the appropriate placement of applications between the edge device 130 and the cloud platform 150 periodically.

However, it is desirable to avoid changing application placement frequently. Therefore, the optimisation engine 530 may also be configured to implement a switching penalty associated with changing the application placement. If there is a placement $a_{ij}(t)$ at time t, it is desirable to ensure that at time (t+1), the optimisation engine 530 minimises differences from the placement $a_{ij}(t)$.

If the previously found placement is defined as $\hat{a}_{ij}$, then the optimisation objective can be modified to:

$$\max_{a_{ij}} \sum_{i=1}^{N} \sum_{j=1}^{M} a_{ij} \times v_{ij} - \lambda \sum_{i=1}^{N} \sum_{j=1}^{M} s_i \|\hat{a}_{ij} - a_{ij}\|$$

Where λ is a switching normaliser and $s_i$ is the switching cost for application i.

The switching cost associated with an application accounts for some applications having a state associated with them. If an application has an associated state, it may maintain some results of its processing internally, to affect the processing of future data. Consider an example where the processing function is to remove duplicates in data. In this example, the application needs to retain state information on which data it has already seen, so that it can identify duplicated data.

Moving an application having an associated state from being executed at the edge device 130 to being executed at the cloud platform 150 (or vice versa) means that the associated state must also be migrated. Continuing the above example of identifying duplicated data, moving the application from being carried out at the edge device 130 to being carried out at the cloud platform 150 introduces the complexity of moving the state associated with the data (i.e. the information on which data the application has already seen). Accordingly, in this example, the switching cost for the application may be high. Other cases may not have an associated state, and migration from the edge device 130 to the cloud platform 150 may simply require stopping the execution of that application in one location and starting it in another location. For these cases, the switching cost for the application may be low.

The switching normaliser is a parameter that controls how likely it is that the placement is switched from one location to another. As the switching normaliser is increased, the likelihood of switching the placement of applications reduces. The frequency of changing the application placement can therefore be controlled by adjusting the value of the switching normaliser.

Once the optimisation engine 530 has solved the above problem to determine the allocation of applications (i.e. processing functions) between the edge device 130 and the cloud platform 150, the allocation engine 540 may send instructions to the edge device 130 and/or the cloud platform 150. That is, the allocation engine 540 may instruct the edge device 130 to carry out any applications 260 that have been determined to be optimally performed at the edge device 130. Likewise, the allocation engine 540 may instruct the cloud platform 150 to carry out any applications 350 that have been determined to be optimally performed at the cloud platform 150.

The primary resource manager module 160 optionally includes a monitoring engine 550. The monitoring engine 550 may be configured to monitor the computational load at the cloud platform 150 (with a corresponding monitoring engine at the secondary resource manager module 170 optionally being configured to monitor the computational load at the edge device 130). The monitoring engine 550 may be configured to adjust the parameters stored in the parameter data store 520 based on the computational load of the cloud platform 150. The monitoring engine 550 may also be configured to monitor network behaviour between the edge device 130 and the cloud platform 150 and update the parameter data store 520 accordingly. As an alternative, the monitoring of the computational load may be carried out by a separate component within the edge device 130 and/or the cloud platform 150, or by a separate device entirely.

The resource manager 500 may be implemented in software, with the optimisation engine 530, allocation engine 540 and monitoring engine 550 each being implemented in software configured to run on a processor of a device that implements the resource manager 500 (i.e. the edge device 130, cloud platform 150, and/or a separate computing device). Alternatively, specific firmware or hardware may be configured to implement the functionality of the resource manager 500.

Figure 6:
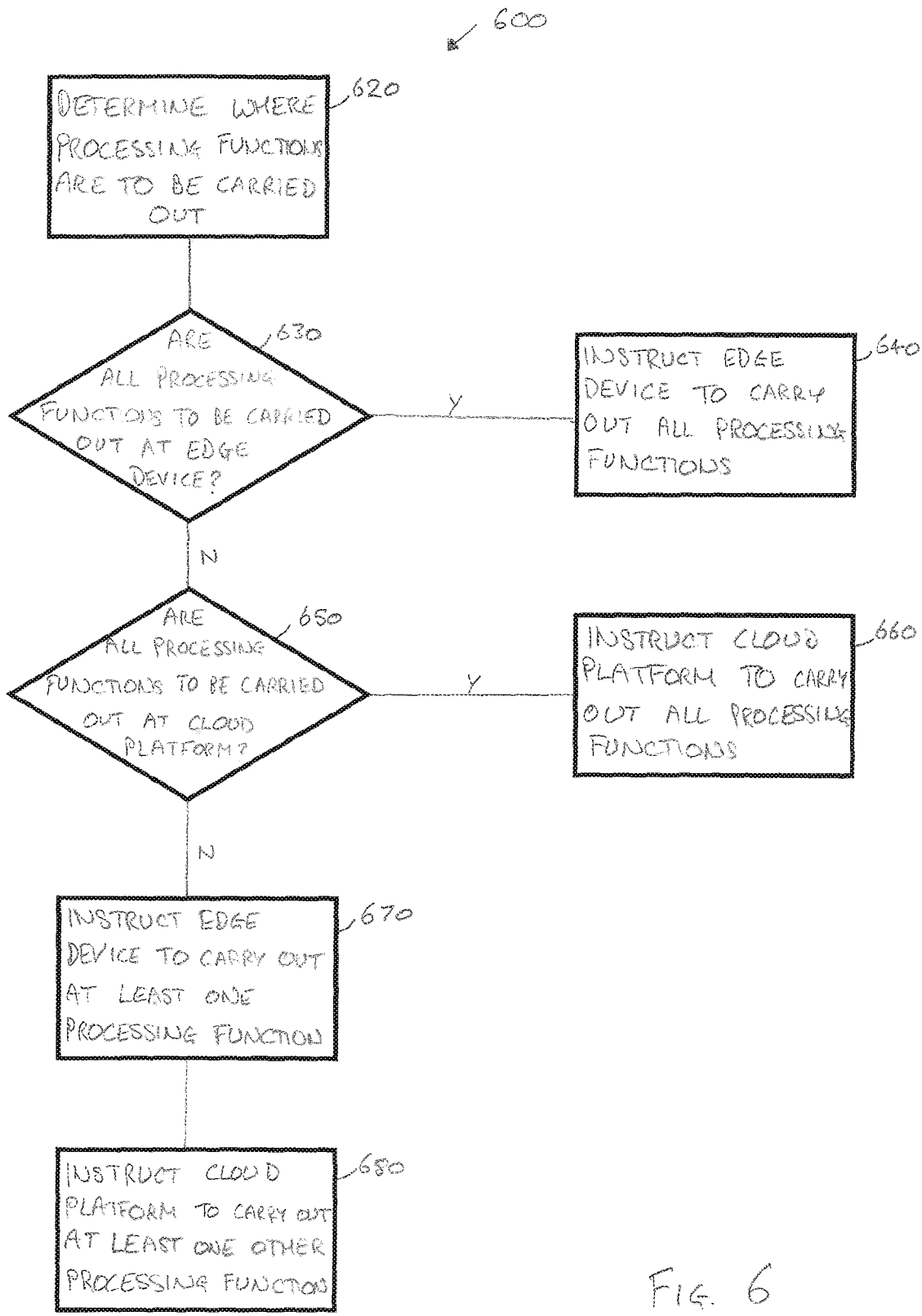
FIG. 6 is a flowchart of a method for processing manufacturing data.

FIG. 6 shows a process 600 for processing manufacturing data. The process 600 may be used to determine whether a plurality of processing functions are to be carried out at the edge device 130 or at the cloud platform 150. The process 600 may be implemented by the resource manager 500. Therefore, the process 600 may be implemented at the primary resource manager module 160 or, if the primary resource manager module is not available, at the secondary resource manager module 170.

Manufacturing data may be received at the system 100. The manufacturing data may be received from a sensing device 120. In one example, manufacturing data may be received from a plurality of sensing devices 120. The manufacturing data may be received at the edge device 130. If a processing function is determined to be carried out at the cloud platform 150, the primary resource manager module 160 may instruct the edge device 130 to send the data to the cloud platform 150 for processing. Alternatively, manufacturing data received at the edge device 130 may be sent to the cloud platform 150 without requiring an instruction from the primary resource manager module 160. Therefore, if the process 600 is implemented at the cloud platform 150, the manufacturing data may be received from the edge device 130.

At 620, the resource manager 500 determines whether the processing functions are to be carried out at the edge device 130 or at the cloud platform 150. The determination may be made using a multi-objective optimisation problem formulated by the optimisation engine 530 based on parameters stored in the parameter data store 520.

At 630, the resource manager 500 determines whether the plurality of processing functions are to be carried out at the edge device 130. If so, resource manager 500 instructs, at 640, the edge device 130 to carry out the plurality of processing functions.

If not, the process moves to 650, at which the resource manager 500 determines whether the plurality of processing functions are to be carried out at the cloud platform 150. If so, the resource manager 500 instructs, at 660, the cloud platform 150 to carry out the plurality of processing functions.

If not, the resource manager 500 has determined that at least one of the plurality of processing functions is to be carried out at the edge device 130 and at least one other processing function is to be carried out at the cloud platform. The process moves to 670, at which the resource manager 500 instructs the edge device 130 to carry out the at least one processing function. At 680, the resource manager 500 instructs the cloud platform 150 to carry out the at least one other processing function.

The process 600 may be made dynamically (for example, at regular intervals). If, at 620, the primary resource manager module 160 determines a new allocation of processing functions between the edge device 130 and the cloud platform 150, the primary resource manager module 160 determines whether the difference in cost between the previous processing function allocation and the new processing function allocation exceeds a switching penalty. If the primary resource manager module 160 determines that the switching penalty is exceeded, it implements the new allocation of the processing functions between the edge device 130 and the cloud platform 150. If the primary resource manager module 160 determines that the switching penalty is not exceeded, it keeps the current allocation of processing functions between the edge device 130 and the cloud platform 150.

Also disclosed are the following numbered clauses:

1. A system for processing manufacturing data, comprising:
    an edge device;
    a cloud platform;
    a sensing device configured to collect manufacturing data and to provide the collected data to the edge device;
    wherein the edge device and the cloud platform are each configured to carry out a plurality of data processing functions on the manufacturing data;
    the system further comprising a resource manager configured to communicate with the edge device and with the cloud platform, wherein the resource manager is further configured to:
        determine whether each of the plurality of data processing functions is to be carried out at the edge device or at the cloud platform;
        if it is determined that the plurality of data processing functions is to be carried out at the edge device, instruct the edge device to carry out the plurality of data processing functions;
        if it is determined that the plurality of data processing functions is to be carried out at the cloud platform, instruct the cloud platform to carry out the plurality of data processing functions; and
        if it is determined that at least one of the plurality of data processing functions is to be carried out at the edge device and at least one other data processing function is to be carried out at the cloud platform, instruct the edge device to carry out the at least one of the plurality of data processing functions and instruct the cloud platform to carry out the at least one other data processing function.

2. The system according to clause 1, wherein:
    the edge device is configured to carry out the plurality of processing functions using communications software, storage software and analysis software selected from a software set comprising a plurality of communications software, a plurality of storage software and a plurality of analysis software; and
    the cloud platform is configured to carry out the plurality of processing functions using communications software, storage software and analysis software selected from the software set.

3. The system according to clause 2, wherein the edge device and the cloud platform are each configured to carry out the plurality of processing functions using a respective plurality of applications implemented using application code, wherein the application code for an application of the plurality of applications is written such that the application is configured to use any of the communications software, storage software and analysis software in the software set to carry out the processing function.

4. The system according to clause 1, wherein:
    the edge device is configured to carry out the plurality of processing functions using communications software, storage software and analysis software; and
    the cloud platform is configured to carry out the plurality of processing functions using at least one of: the communications software, the storage software and the analysis software used by the edge device to carry out the plurality of processing functions.

5. The system according to clause 1, wherein:
    the edge device is a first edge device, the system further comprising a second edge device;
    the second edge device is configured to carry out the plurality of data processing functions on the manufacturing data; and
    the resource manager is configured to:
        communicate with the second edge device; and
        determine whether each of the plurality of data processing functions is to be carried out at the first edge device, at the second edge device, or at the cloud platform.

6. The system according to any of clauses 1 to 5, wherein:
    the resource manager is configured to determine whether each of the data processing functions is to be carried out at the edge device or at the cloud platform dynamically.

7. The system according to any of clauses 1 to 6, wherein the resource manager is configured to determine whether the data processing function is to be carried out at the edge device or at the cloud platform based on one or more parameters.

8. The system according to clause 7, wherein the resource manager is configured to determine whether the data processing function is to be carried out at the edge device or at the cloud platform based on a plurality of parameters, wherein the determination comprises:
    formulating a multi-objective optimisation problem based on the plurality of parameters; and
    solving the multi-objective optimisation problem to determine whether the data processing function is to be carried out at the edge device or at the cloud platform.

9. The system according to clause 7 or clause 8, wherein the parameters include at least one of the computational load at the edge device and the computational load at the cloud platform.

10. The system according to any of clauses 7 to 9, wherein the parameters include the network behaviour between the edge device and the cloud platform.

11. The system according to any of clauses 7 to 10, wherein the parameters include a user constraint.

12. The system according to clause 11, wherein the user constraint includes a data privacy constraint and/or a data security constraint.

13. The system according to any of clauses 7 to 12, wherein the parameters include a data processing performance metric.

14. The system according to clause 13, wherein the data processing performance metric based on at least one of: a desired data processing fidelity, a desired data throughput, and a desired data processing latency.

15. The system according to any of clauses 1 to 14, wherein:
    the resource manager comprises a first resource manager module and a second resource manager module, the first resource manager module being configured to run at the cloud platform, and the second resource manager module being configured to run at the edge device; and
    each of the first resource manager module and the second resource manager module is configured to determine whether each of the plurality of data processing functions is to be carried out at the edge device or at the cloud platform.

16. A resource manager for determining the allocation of manufacturing data processing functions, the resource manager being configured to communicate with an edge device and with a cloud platform, each of the edge device and the cloud platform being configured to carry out a plurality of data processing functions on the manufacturing data, the resource manager comprising:

an optimisation engine configured to determine whether each of the plurality of data processing functions is to be carried out at the edge device or at the cloud platform; and an allocation engine configured to:
instruct the edge device to carry out the plurality of data processing functions, if the optimisation engine determines that the plurality of data processing functions is to be carried out at the edge device;
instruct the cloud platform to carry out the plurality of data processing functions, if the optimisation engine determines that the plurality of data processing functions is to be carried out at the cloud platform; and
instruct the edge device to carry out at least one of the plurality of data processing functions and instruct the cloud platform to carry out at least one other data processing function, if the optimisation engine determines that the at least one of the plurality of data processing functions is to be carried out at the edge device and the at least one other data processing function is to be carried out at the cloud platform.

17. A computer-implemented method for processing manufacturing data, the method being implemented by a resource manager configured to communicate with an edge device and with a cloud platform, each of the edge device and the cloud platform being configured to carry out a plurality of data processing functions on the manufacturing data, the method comprising:
determining whether each of the plurality of data processing functions is to be carried out at the edge device or at the cloud platform;
responsive to determining that the plurality of data processing functions is to be carried out at the edge device, instructing the edge device to carry out the plurality of data processing functions;
responsive to determining that the plurality of data processing functions is to be carried out at the cloud platform, instructing the cloud platform to carry out the plurality of data processing functions; and
responsive to determining that at least one of the plurality of data processing functions is to be carried out at the edge device and at least one other data processing function is to be carried out at the cloud platform, instructing the edge device to carry out the at least one of the plurality of data processing functions and instructing the cloud platform to carry out the at least one other data processing function.

18. A computer-readable medium comprising computer-executable instructions that, when executed by a processor of a computing device, cause the computing device to perform the method of clause 17.

The invention claimed is:
1. A system for processing manufacturing data, comprising:
an edge device;
a cloud platform;
a sensing device configured to collect manufacturing data and to provide the collected data to the edge device;
wherein the edge device and the cloud platform are each configured to carry out a plurality of data processing functions on the manufacturing data;
the system further comprising a resource manager configured to communicate with the edge device and with the cloud platform, wherein the resource manager is further configured to:
determine whether each of the plurality of data processing functions is to be carried out at the edge device or at the cloud platform;
if it is determined that the plurality of data processing functions is to be carried out at the edge device, instruct the edge device to carry out the plurality of data processing functions;
if it is determined that the plurality of data processing functions is to be carried out at the cloud platform, instruct the cloud platform to carry out the plurality of data processing functions; and
if it is determined that at least one of the plurality of data processing functions is to be carried out at the edge device and at least one other data processing function is to be carried out at the cloud platform, instruct the edge device to carry out the at least one of the plurality of data processing functions and instruct the cloud platform to carry out the at least one other data processing function.

2. The system according to claim 1, wherein:
the edge device is configured to carry out the plurality of processing functions using communications software, storage software and analysis software selected from a software set comprising a plurality of communications software, a plurality of storage software and a plurality of analysis software; and
the cloud platform is configured to carry out the plurality of processing functions using communications software, storage software and analysis software selected from the software set.

3. The system according to claim 2, wherein the edge device and the cloud platform are each configured to carry out the plurality of processing functions using a respective plurality of applications implemented using application code, wherein the application code for an application of the plurality of applications is written such that the application is configured to use any of the communications software, storage software and analysis software in the software set to carry out the processing function.

4. The system according to claim 1, wherein:
the edge device is configured to carry out the plurality of processing functions using communications software, storage software and analysis software; and
the cloud platform is configured to carry out the plurality of processing functions using at least one of: the communications software, the storage software and the analysis software used by the edge device to carry out the plurality of processing functions.

5. The system according to claim 1, wherein:
the edge device is a first edge device, the system further comprising a second edge device;
the second edge device is configured to carry out the plurality of data processing functions on the manufacturing data; and
the resource manager is configured to:
communicate with the second edge device; and
determine whether each of the plurality of data processing functions is to be carried out at the first edge device, at the second edge device, or at the cloud platform.

6. The system according to claim 1, wherein:
the resource manager is configured to determine whether each of the data processing functions is to be carried out at the edge device or at the cloud platform dynamically.

7. The system according to claim 1, wherein the resource manager is configured to determine whether the data processing function is to be carried out at the edge device or at the cloud platform based on one or more parameters.

8. The system according to claim 7, wherein the resource manager is configured to determine whether the data processing function is to be carried out at the edge device or at the cloud platform based on a plurality of parameters, wherein the determination comprises:
formulating a multi-objective optimisation problem based on the plurality of parameters; and
solving the multi-objective optimisation problem to determine whether the data processing function is to be carried out at the edge device or at the cloud platform.

9. The system according to claim 7, wherein the parameters include at least one of the computational load at the edge device and the computational load at the cloud platform.

10. The system according to claim 7, wherein the parameters include the network behaviour between the edge device and the cloud platform.

11. The system according to claim 7, wherein the parameters include a user constraint.

12. The system according to claim 11, wherein the user constraint includes a data privacy constraint and/or a data security constraint.

13. The system according to claim 7, wherein the parameters include a data processing performance metric.

14. The system according to claim 13, wherein the data processing performance metric based on at least one of: a desired data processing fidelity, a desired data throughput, and a desired data processing latency.

15. The system according to claim 1, wherein:
the resource manager comprises a first resource manager module and a second resource manager module, the first resource manager module being configured to run at the cloud platform, and the second resource manager module being configured to run at the edge device; and
each of the first resource manager module and the second resource manager module is configured to determine whether each of the plurality of data processing functions is to be carried out at the edge device or at the cloud platform.

16. A resource manager for determining the allocation of manufacturing data processing functions, the resource manager being configured to communicate with an edge device and with a cloud platform, each of the edge device and the cloud platform being configured to carry out a plurality of data processing functions on the manufacturing data, the resource manager comprising:
an optimisation engine configured to determine whether each of the plurality of data processing functions is to be carried out at the edge device or at the cloud platform; and an allocation engine configured to:
instruct the edge device to carry out the plurality of data processing functions, if the optimisation engine determines that the plurality of data processing functions is to be carried out at the edge device;
instruct the cloud platform to carry out the plurality of data processing functions, if the optimisation engine determines that the plurality of data processing functions is to be carried out at the cloud platform; and
instruct the edge device to carry out at least one of the plurality of data processing functions and instruct the cloud platform to carry out at least one other data processing function, if the optimisation engine determines that the at least one of the plurality of data processing functions is to be carried out at the edge device and the at least one other data processing function is to be carried out at the cloud platform.

17. A computer-implemented method for processing manufacturing data, the method being implemented by a resource manager configured to communicate with an edge device and with a cloud platform, each of the edge device and the cloud platform being configured to carry out a plurality of data processing functions on the manufacturing data, the method comprising:
determining whether each of the plurality of data processing functions is to be carried out at the edge device or at the cloud platform;
responsive to determining that the plurality of data processing functions is to be carried out at the edge device, instructing the edge device to carry out the plurality of data processing functions;
responsive to determining that the plurality of data processing functions is to be carried out at the cloud platform, instructing the cloud platform to carry out the plurality of data processing functions; and
responsive to determining that at least one of the plurality of data processing functions is to be carried out at the edge device and at least one other data processing function is to be carried out at the cloud platform, instructing the edge device to carry out the at least one of the plurality of data processing functions and instructing the cloud platform to carry out the at least one other data processing function.

18. A computer-readable medium comprising computer-executable instructions that, when executed by a processor of a computing device, cause the computing device to perform the method of claim 17.

* * * * *